United States Patent
Sexton et al.

(10) Patent No.: US 9,919,793 B2
(45) Date of Patent: Mar. 20, 2018

(54) AIRCRAFT LANDING GEAR ASSEMBLY

(71) Applicant: Messier-Dowty Limited, Gloucester, Gloucestershire (GB)

(72) Inventors: Matthew Sexton, Hempsted (GB); Robert Kyle Schmidt, Cheltenham (GB)

(73) Assignee: SAFRAN LANDING SYSTEMS UK LTD, Gloucestershire (GB)

( * ) Notice: Subject to any disclaimer, the term of this patent is extended or adjusted under 35 U.S.C. 154(b) by 0 days.

(21) Appl. No.: 14/882,599

(22) Filed: Oct. 14, 2015

(65) Prior Publication Data
US 2016/0107747 A1 Apr. 21, 2016

(30) Foreign Application Priority Data
Oct. 16, 2014 (EP) ..................................... 14189230

(51) Int. Cl.
- B64C 25/36 (2006.01)
- B64C 25/42 (2006.01)
- B64C 25/08 (2006.01)

(52) U.S. Cl.
CPC .............. B64C 25/36 (2013.01); B64C 25/08 (2013.01); B64C 25/42 (2013.01)

(58) Field of Classification Search
CPC .......... B64C 25/36; B64C 25/42; B64C 25/46
See application file for complete search history.

(56) References Cited

U.S. PATENT DOCUMENTS

| | | | |
|---|---|---|---|
| 2,533,607 A | 12/1950 | Neilson et al. | |
| 2,943,820 A * | 7/1960 | Westcott, Jr. | B64C 25/34 244/103 R |
| 4,720,063 A * | 1/1988 | James | B64C 25/14 244/102 R |
| 4,892,270 A | 1/1990 | Derrien | |
| 5,263,664 A | 11/1993 | Derrien | |
| 5,806,794 A | 9/1998 | Hrusch | |
| 6,149,100 A * | 11/2000 | Ralph | B64C 25/34 244/103 R |
| 2007/0158496 A1 * | 7/2007 | Yourkowski | B64C 25/34 244/102 R |
| 2007/0228825 A1 | 10/2007 | Perriard | |
| 2012/0256050 A1 | 10/2012 | Hilliard | |

FOREIGN PATENT DOCUMENTS

| | | | |
|---|---|---|---|
| EP | 0219724 A1 | 4/1987 | |
| FR | 2305775 A1 * | 10/1976 | ............ B60T 8/1703 |
| GB | 635842 | 4/1950 | |
| GB | 664548 | 1/1952 | |
| GB | 809950 | 3/1959 | |
| GB | 2493675 | 2/2013 | |
| WO | 2006094145 | 9/2006 | |

OTHER PUBLICATIONS

Extended European Search Report for European Application No. 14189230.7, dated Mar. 17, 2015, 7 pages.

* cited by examiner

Primary Examiner — Brian M O'Hara
(74) Attorney, Agent, or Firm — RatnerPrestia

(57) ABSTRACT

An aircraft landing gear assembly having a main strut and an axle on which wheel and brake assemblies are mounted. An adaptor member is mounted on a mounting pin and arranged to define a brake rod anchor point. The adaptor member is coupled to a part of the landing gear assembly so as to react brake torque and can be formed from a different material than a portion of the main strut.

20 Claims, 2 Drawing Sheets

AIRCRAFT LANDING GEAR ASSEMBLY

This application claims the benefit of European Application EP 14189230.7, filed Oct. 16, 2014, which is incorporated by reference herein in its entirety.

BACKGROUND OF THE INVENTION

An aircraft landing gear can include an axle for supporting wheel and brake assemblies. It is common for a main landing gear to include two or more axles on a bogie beam. Wheel and brake assemblies are mounted on each axle, each brake assembly being arranged to apply a braking force to a wheel assembly in order to slow the aircraft while it is on the ground.

As will be appreciated by a person skilled in the art, a brake torque is generated as a brake assembly transmits a braking force to the wheel assembly. It is common for a brake assembly to be mounted so as to be free to rotate relative to the axle on which it is mounted. It is therefore necessary to provide means by which the brake torque can be reacted, to inhibit the brake assembly from rotating with the wheel assembly during application of the braking force.

In this regard, it is known to provide a brake rod to react brake torque generated as a brake assembly applies a braking force to a wheel assembly. A brake rod connects a brake assembly to an anchor point on the landing gear such that the brake rod reacts brake torque either in tension or in compression.

In the case of multi axle landing gear, it is common for brake rods to be provided below and parallel with respect to the bogie beam. As such, a lower region of the main strut sliding tube or "slider" is provided with attachment lugs which define an anchor point to which the brake rods can be coupled. Brake assemblies are generally designed to be mounted on an axle in a particular orientation corresponding to this arrangement.

However, the present inventors have identified that known landing gear assemblies can result in a lack of flexibility in terms of selection of an anchor point.

SUMMARY OF THE INVENTION

In accordance with a first aspect of the present invention there is provided an aircraft landing gear assembly comprising:
- a main strut arranged to be coupled to an aircraft;
- an elongate axle coupled to the main strut;
- a wheel assembly and a brake assembly mounted on the axle;
- a brake rod coupled to brake assembly; and
- an adaptor member distinct from the main strut and mounted on a mounting pin, the adaptor member comprising a first arm which defines an anchor point to which the brake rod is coupled, the adaptor member being coupled to the landing gear assembly in a manner inhibiting relative rotation between the adaptor member and the mounting pin.

Thus, the first aspect provides an aircraft landing gear assembly including an axle on which wheel and brake assemblies are mounted. An adaptor member, which is distinct from the strut, is mounted on a mounting pin and is arranged to define a brake rod anchor point. The adaptor member is coupled to the landing gear assembly to react brake torque. Thus, the adaptor member can enable the brake rod to be connected to an anchor point that is in a similar location to a conventional anchor point, such as below the bogie hinge or pivot pin, but the anchor point need not be defined by the lower region of the strut, which is generally a slider. The dedicated adaptor member can be retrofitted on existing landing gear assemblies and be formed from a material that is better suited to reacting brake torque in comparison to conventional parts such as a slider. Also, the adaptor member can be configured to position the brake rod anchor point independently from the geometry and articulation of other landing gear assembly parts.

The mounting pin can be arranged to inhibit movement of the adaptor member relative to the bogie beam in degrees of freedom other than rotation; for example, the pin can be generally cylindrical in shape, which enables parts such as the bogie hinge pin to serve also as the mounting pin. Thus in some embodiments the pin can comprise a pin joint between first and second elements of the landing gear assembly, the first and second parts each being distinct from the adaptor member.

In such cases the adaptor member can include a second arm defining an auxiliary anchor point via which the adaptor member is coupled to the landing gear assembly so as to inhibit relative rotation between the adaptor member and the mounting pin.

Alternatively, the pin can have a non-circular periphery so as to define anti-rotation surfaces between the mounting pin and adaptor member. The periphery of the pin can for example be rectangular in cross section perpendicular to its longitudinal axis, or can include splines or the like.

The bogie beam can be pivotally coupled to the strut via a bogie hinge pin. The mounting pin can comprise the bogie hinge pin.

The first and/or second portion of the adaptor member can be elongate.

The landing gear assembly can include a second adaptor member having a third arm arranged in a spaced parallel relationship with respect to the first arm and defining a second anchor point that is coaxial with the first anchor point.

The third arm can be coupled to the landing gear assembly via the mounting pin. For example, the first and second adaptor members can each be coupled to the mounting pin via engagement formations arranged to prevent relative rotation between the adaptor members and the mounting pin.

The second adaptor member can include a fourth arm arranged to define a second auxiliary anchor point, the third arm being coupled to the landing gear assembly via the fourth arm.

The main strut can comprise a main fitting and a slider coupled to one another via a torque link, and the first and/or second auxiliary anchor points can be coupled to the torque link mounting pin.

The main strut can be arranged to be movably coupled to the aircraft so as to be movable between a deployed condition, for take-off and landing, and a stowed condition, for flight.

According to a second aspect of the present invention, there is provided an aircraft including one or more landing gear assembly according to the first aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
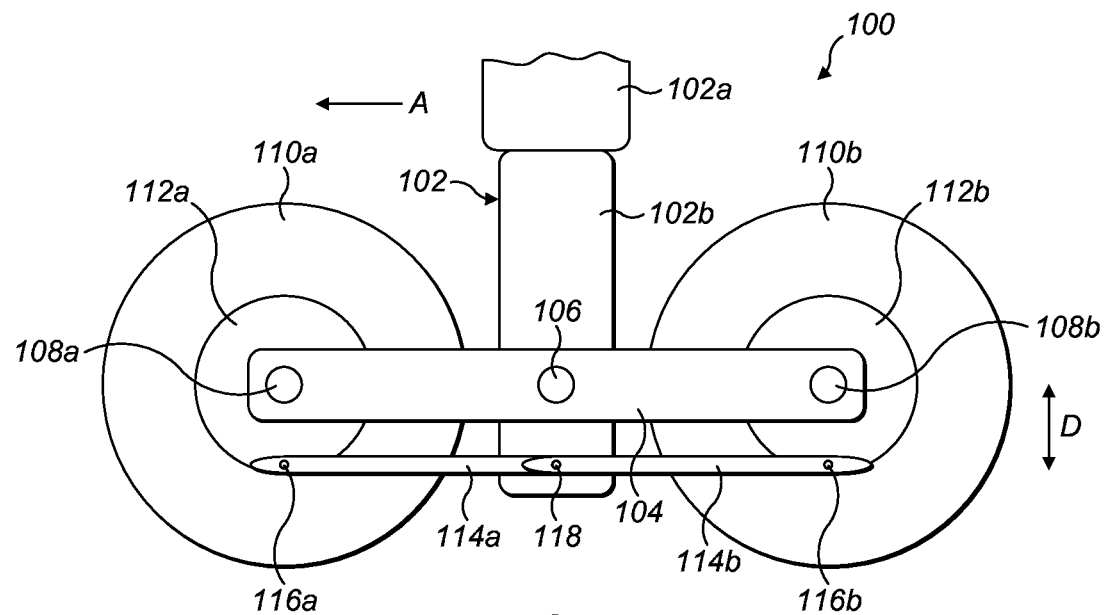
FIG. 1 is a schematic diagram of a prior art aircraft landing gear assembly.

FIG. 1 shows a schematic partial side view of a known aircraft landing gear 100. The landing gear 100 has a main shock absorbing strut 102 having a main fitting 102a within which is telescopically housed a slider 102b. A bogie beam 104 is pivotally mounted to a lower end region of the slider 102b at a bogie pivot 106. A torque link (not shown) couples the slider 102b to the main fitting 102a to limit relative rotation about the longitudinal axis of the main shock absorbing strut 102.

The bogie beam 104 carries a first axle 108a fore of the bogie hinge pin 106. The first axle 108a carries a first wheel assembly 110a and a first brake assembly 112a. The first brake assembly 112a is arranged to apply a braking force to the first wheel assembly 110a. The bogie beam 104 further carries a second axle 108b aft of the pivot axle 106. The second axle 108b carries a second wheel assembly 110b and second brake assembly 112b, the second brake assembly 112b being arranged to apply a braking force to the second wheel assembly 110b. The wheel assemblies 110a, 110b and brake assemblies 112a, 112b are each mounted so as to be freely rotatable about the longitudinal axis of a respective axle 108a, 108b on which they are mounted.

The first brake assembly 112a is mechanically coupled to the landing gear strut 102 via a first brake rod 114a. The first brake rod 114a is coupled to the main strut 102 via an anchor point 118, which may be a pin or the like, and coupled to the first brake assembly 112a via a pin 116a. Similarly, the second brake assembly 112b is mechanically coupled to the landing gear main strut 102 via a second brake rod 114b, the second brake rod 114b being coupled to the main strut 102 via the anchor point 118 and to the second brake assembly 112b via a pin 116b.

In use, with the aircraft travelling in the direction of arrow A, the brake assemblies 112a, 112b may be activated so as to apply a braking force to the wheel assemblies 110a, 110b. The brake rods 114a, 114b are arranged to react the brake torque generated due to the applied braking force. The brake torque from the first brake assembly 112a results in the first brake rod 114a experiencing a compressive force as it reacts the brake torque. However, the brake torque generated by the second brake assembly 112b is experienced by the second brake rod 114b as a tensile force.

The present inventors have identified that it can be desirable reduce the load on the landing gear slider arising from reaction of brake torque. This can however be problematic in practice. For example, some landing gear designs include four brake rods coupled to a common slider attachment pin. Geometry and space constraints can make it difficult to modify this arrangement to provide a pair of slider attachment pins on the slider to share the load from the four brake rods. Even if geometry and space constrains allow the provision of multiple pins, the complexity of the forged slider is increased.

Figure 2:
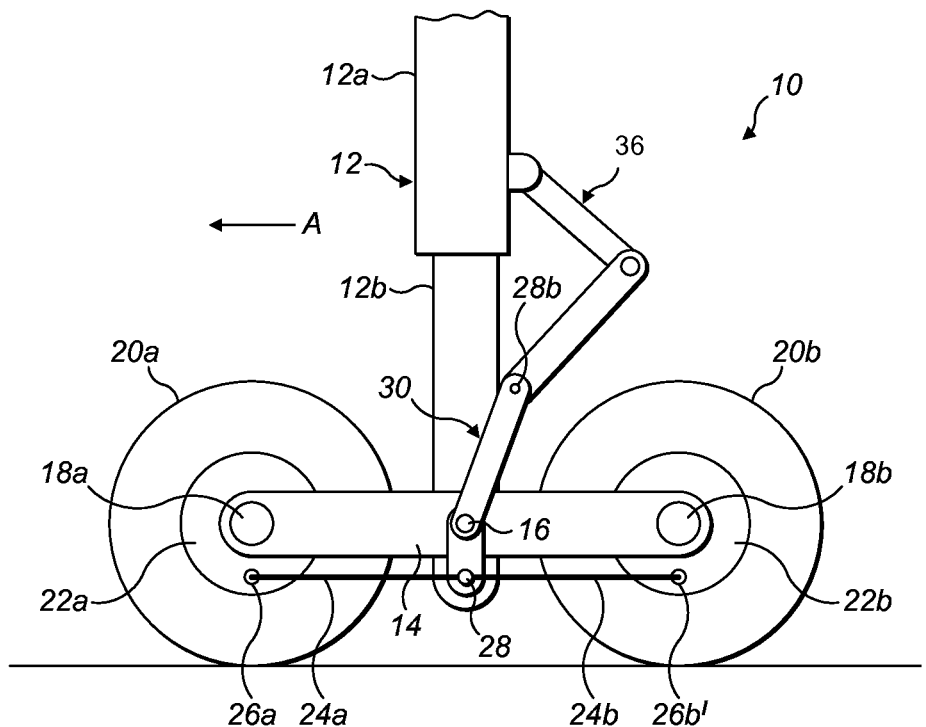
FIG. 2 is a schematic diagram of an aircraft landing gear assembly according to an embodiment of the invention.

FIG. 2 shows a schematic, partial side view of an aircraft landing gear according to a first embodiment of the present invention. The aircraft landing gear 10 is similar to the landing gear 100 in that it includes a main shock absorbing strut 12 having a main fitting 12a and a slider 12b, the slider 12b being pivotally connected to a bogie beam 14 via a bogie hinge pin 16.

The bogie beam 14 carries a first axle 18a fore of the bogie hinge pin 16. The first axle 18a carries a first wheel assembly 20a and a first brake assembly 22a. The first brake assembly 22a is arranged to apply a braking force to the first wheel assembly 20a. The bogie beam 14 further carries a second axle 18a aft of the pivot axle 16. The second axle 18b carries a second wheel assembly 20b and second brake assembly 22b, the second brake assembly 22b being arranged to apply a braking force to the second wheel assembly 20a. The first and second axles 18a, 18b are adjacent, i.e. do not have a further wheel assembly axle between them, and thus form an axle pair.

The landing gear 10 according to the illustrated embodiment differs from the known landing gear 100 in that the brake rods 24a, 24b are each coupled to an anchor point 28 defined by an adaptor member 30, rather than an anchor point defined by the slider 12b. This can reduce the brake reaction forces acting on the lower region of the slider 12b and enables the configuration of the brake rod anchor point(s) to be detached from the geometry and space constrains associated with the configuration of the slider 12b. Also, the adaptor member 30, which has a relatively simple geometry in comparison to the slider, can be formed from a more application specific material such as steel or other metallic materials, or organic or metal matrix composite materials.

Figure 3:
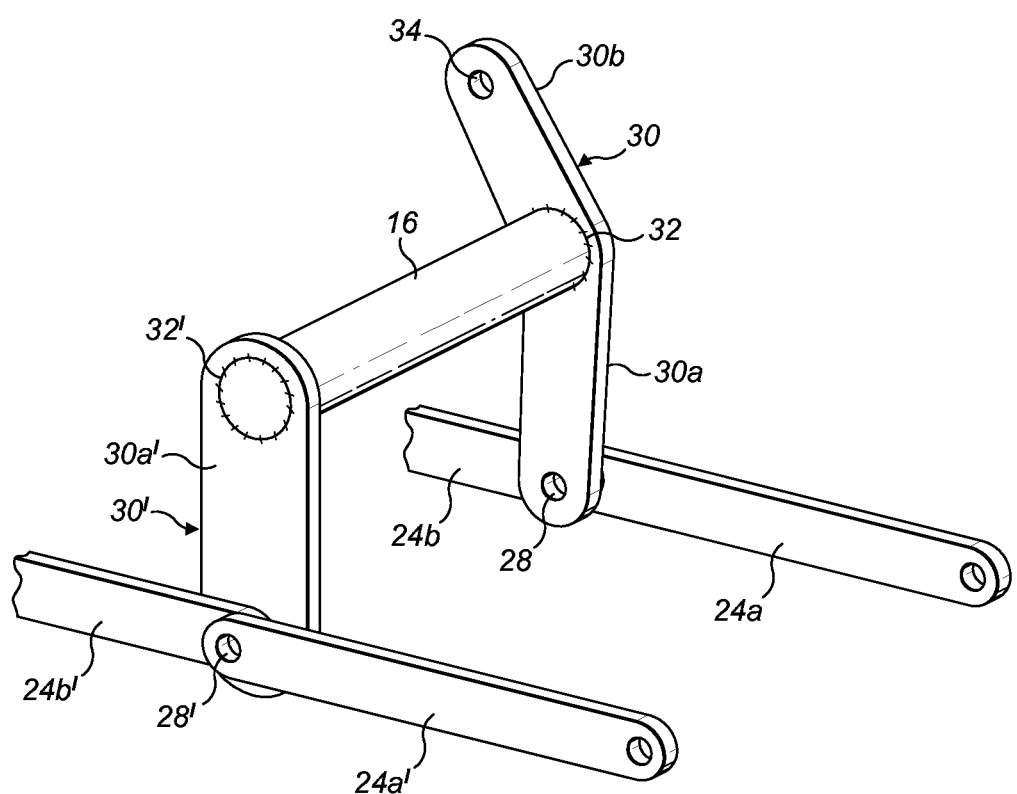
FIG. 3 is a schematic diagram of parts of the landing gear assembly of FIG. 2.

Referring additionally to FIG. 3, the adaptor member 30 is mounted on a mounting pin 16 arranged to inhibit movement of the adaptor member 30 relative to the slider 12b in degrees of freedom other than rotation. In the illustrated example the mounting pin 16 is the bogie hinge pin 16; however, in other embodiments the mounting pin could for example be a dedicated pin mounted coaxially within the bogie hinge pin 16 or a dedicated pin mounted elsewhere on the landing gear assembly. The adaptor member 30 includes a first portion 30a which defines an anchor point 28 to which the brake rods 24a, 24b on one side of the bogie 14 are coupled, and a second portion 30b defining an auxiliary anchor point 34 via which the adaptor member 30 is coupled to a part the landing gear assembly 10 so as to inhibit relative rotation between the adaptor member 30 and the mounting pin 16. In the illustrated example the auxiliary anchor point 34 is coupled to the lower mounting pin 28b of a torque link 36, but in other embodiments the auxiliary anchor point can take any suitable form. In some embodiments where a dedicated mounting pin is provided, the pin and adaptor member 30 can be configured to inhibit relative rotation between them; for example a splined or other non-circular engagement profile.

A second adaptor member 30' is provided on the opposite side of the bogie 14 and includes a third portion 30a' which defines an anchor point 28' to which the brake rods 24a', 24b' on the opposite sides of the bogie 14 are coupled. In the illustrated example the adaptor members 30, 30' are each mechanically coupled to the bogie hinge pin 16 by splines or the like in order to inhibit rotation between the bogie hinge pin 16 and adaptor members 30, 30'. Thus, the bogie hinge pin 16 acts as a mechanical coupling arranged to transmit torque between the adaptor members 30, 30', meaning that a single auxiliary anchor point 34 can react brake toque from sets of brake rods 24a, 24b, 24a', 24b' on both side of the bogie 14. However, in other embodiments the second adaptor plate can be provided with a fourth portion that is similar to the second portion 30b, or mounted on a mounting pin which inhibits rotation, in which case both adaptor members 30, 30' can be mounted on the mounting pin without splines or the like.

Upon application of a braking force, the adaptor plates 30, 30' react brake torque about the bogie hinge pin 16 axis. The auxiliary anchor 34 can be spaced further from the bogie hinge pin 16 axis in comparison to the anchor points 28, 28' to provide moment advantage.

In embodiments of the invention a lost motion mechanism such as a horn block or the like can be built into the linkage between the mounting pin and the auxiliary anchor of each adaptor member in order to cater for relative deflections between the parts.

In embodiments of the invention the adaptor member(s) can take any suitable form, such as a plate or bar, and can be formed from any suitable aircraft landing gear material; for example, a metal such as aluminium or titanium, or a hard plastics material.

Although the illustrated embodiment includes a pair of adaptor members 30, 30', other embodiments can include a single adaptor member coupled by a lateral extension pin or the like to two or more brake rods.

For clarity, the above description and referenced figures show implementation in respect of a simplified landing gear assembly. It will however be appreciated that any of the designs described herein could be implemented on any design of landing gear, for example nose landing gear having a single axle, main landing gear with a bogie beam having two or more axles.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
  a main strut arranged to be coupled to an aircraft;
  an elongate axle movably coupled to the main strut;
  a wheel assembly mounted on the axle;
  a brake assembly mounted on the axle;
  a first brake rod coupled at a first location on the first brake rod to the brake assembly; and
  a first adaptor member distinct from the main strut and mounted on a mounting pin to be rotatable relative to the main strut, the first adaptor member comprising a first arm that defines a first anchor point to which the first brake rod is coupled at a second location on the first brake rod, the first adaptor member being coupled to a first part of the landing gear assembly distinct from the first adaptor member in a manner inhibiting relative rotation between the first adaptor member and the mounting pin;
  wherein the first adaptor member includes a second arm defining a first auxiliary anchor point via which the first adaptor member is coupled to a second part of the landing gear assembly distinct from the first adaptor member and distinct from the first part of the landing gear assembly so as to inhibit relative rotation between the first adaptor member and the mounting pin.

2. The aircraft landing gear assembly of claim 1, wherein the mounting pin is arranged to inhibit movement of the first adaptor member relative to the main strut in degrees of freedom other than rotation.

3. The aircraft landing gear assembly of claim 1, wherein the mounting pin comprises a pin joint between first and second elements of the landing gear assembly, the first and second elements each being distinct from the first adaptor member.

4. The aircraft landing gear assembly of claim 3, wherein: the first element comprises the main strut and the second element comprises a bogie beam; the bogie beam is pivotally coupled to the main strut via a bogie hinge pin; and the mounting pin comprises the bogie hinge pin.

5. The aircraft landing gear assembly of claim 1, wherein the first arm and/or the second arm is elongate.

6. The aircraft landing gear assembly of claim 1, further comprising a second adaptor member having a third arm arranged in a spaced parallel relationship with respect to the first arm, and defining a second anchor point for at least a second brake rod.

7. The aircraft landing gear assembly of claim 6, wherein the second anchor point is coaxial with the first anchor point.

8. The aircraft landing gear assembly of claim 6, wherein the third arm is coupled to the landing gear assembly via the mounting pin, the first adaptor member and the second adaptor member each being coupled to the mounting pin via engagement formations arranged to prevent relative rotation between the first adaptor member, the second adaptor member and the mounting pin.

9. The aircraft landing gear assembly of claim 6, wherein the second adaptor member includes a fourth arm arranged defining a second auxiliary anchor point via which the second adaptor member is coupled to the landing gear assembly.

10. The aircraft landing gear assembly of claim 1, wherein the main strut comprises a main fitting and a slider coupled to one another via a torque link, and the first auxiliary anchor point is coupled to a torque link mounting pin.

11. The aircraft landing gear assembly of claim 6, wherein the first arm and/or third arm extends generally parallel with respect to the longitudinal axis of the main strut.

12. The aircraft landing gear assembly of claim 1, wherein the first auxiliary anchor point includes a lost motion device.

13. The aircraft landing gear assembly of claim 1, wherein the first adaptor member is formed from a different material than a lower portion of the main strut.

14. The aircraft landing gear assembly of claim 1, wherein the mounting pin connects the first adapter member to a lower portion of the main strut.

15. The aircraft landing gear assembly of claim 14, wherein the mounting pin is coaxial with a bogie hinge pin connecting the bogie beam to the main strut.

16. The aircraft landing gear assembly of claim 14, wherein the main strut comprises a main fitting and a slider coupled to one another via a torque link, and the mounting pin connects the first adapter member to the slider.

17. An aircraft landing gear assembly comprising:
  a main strut arranged to be coupled to an aircraft;
  an elongate axle movably coupled to the main strut;
  a wheel assembly mounted on the axle;
  a brake assembly mounted on the axle;
  a brake rod coupled to brake assembly; and
  an adaptor member distinct from the main strut and mounted on a mounting pin to be rotatable relative to the main strut, the adaptor member comprising a first arm which defines an anchor point to which the brake rod is coupled, the adaptor member being coupled to an anchor region of the landing gear assembly distinct from the adaptor member in a manner inhibiting relative rotation between the adaptor member and the mounting pin, wherein the adaptor member includes a second arm defining an auxiliary anchor point via which the adaptor member is coupled to the anchor region of the landing gear assembly so as to inhibit relative rotation between the adaptor member and the mounting pin.

18. An aircraft including one or more landing gear assemblies of claim 1.

19. The aircraft landing gear assembly according to claim 17, wherein the anchor region of the landing gear assembly is part of the main strut.

20. The aircraft landing gear assembly according to claim 17, wherein the first adaptor member is coupled to the main strut.

* * * * *